United States Patent [19]

Ikeda et al.

[11] 4,208,555

[45] Jun. 17, 1980

[54] TORQUE CONTROL DEVICE FOR AN ELECTRICALLY-DRIVEN TOOL

[75] Inventors: Katsuzo Ikeda; Ikuo Kitagawa, both of Iruma, Japan

[73] Assignee: Olympic Fishing Tackles Co., Ltd., Iruma, Japan

[21] Appl. No.: 805,400

[22] Filed: Jun. 10, 1977

[30] Foreign Application Priority Data

Jun. 14, 1976 [JP] Japan .................. 51-69904

[51] Int. Cl.² ........................................... H01H 35/00
[52] U.S. Cl. .................................. 200/52 R; 192/150; 200/157
[58] Field of Search ...................... 200/61.39, 61.45 R, 200/61.46, 61.53, 153 N, 157, 80 R; 144/32 R, 32 S; 81/52.4 R, 52.4 A, 52.5; 192/150; 173/12; 310/68 B; 318/475

[56] References Cited

U.S. PATENT DOCUMENTS

| 2,901,076 | 8/1959 | Dean | 192/50 |
|---|---|---|---|
| 3,419,087 | 12/1968 | Amtsberg et al. | 173/12 |
| 3,802,518 | 4/1974 | Albert | 144/32 |
| 3,906,819 | 9/1975 | Curtis | 81/52.4 R |
| 4,049,104 | 9/1977 | Webb | 192/150 |

FOREIGN PATENT DOCUMENTS 1142027  1/1963  Fed. Rep. of Germany ........... 200/157

*Primary Examiner*—James R. Scott
*Attorney, Agent, or Firm*—Birch, Stewart, Kolasch & Birch

[57] ABSTRACT

The present invention is directed to a torque control device for an electrically driven tool. The torque control device includes a stationary cam rotatably and detachably connected to an output shaft and a movable cam adapted to be rotatably and slidably engaged by said stationary cam. An adjustable screw cover is provided for adjusting the compression force of a spring against the movable cam thereby regulating the torque acting on the driven tool. The slidably connection between the stationary cam and the movable cam enables the releasing of the rotational force supplied to the stationary cam when the load on the driven tool exceeds a predetermined set torque.

5 Claims, 28 Drawing Figures

W: Angular velocity

Tk: Set torque

So: Time during which the inertia force goes out of existence

To: Torque responding to So

S1: Break point of the power transmission at the Tk

TORQUE CONTROL DEVICE FOR AN ELECTRICALLY-DRIVEN TOOL

BACKGROUND OF THE INVENTION

1. Field of the Invention

This invention relates to an electric tool and particularly to a torque control device such as an electric screw-driver.

2. Description of the Prior Art

Electric torque control devices incorporating a transformer are known in the prior art. However, these devices present a disadvantage in that, the torque is set in response to a value of a power source voltage.

The variation of the voltage influences and the number of revolution of the motor, resulting in a delay in the time during which the screw-in operation of machine screws is completed in an assembly line.

There is also known an electric torque control device incorporating transistors in which the electric current is terminated as soon as it reaches a predetermined value. In this type of device, the heat which is produced by a motor which is in operation for a long period increases a demagnetization, resulting in the fluctuation of the electric current. Consequently, the value of the current increases and, accordingly, a slight change occurs in the relationship between the predetermined value of the current and the torque. Further, it is impossible to exactly detect the torque since a time during which the detection is effected is not constant when the transistor detects a predetermined torque, for example current. Moreover, the primary voltage is not constant and the fluctuation of the primary voltage influences the secondary voltage, resulting in the fluctuation of the torque.

SUMMARY OF THE INVENTION

The object of the present invention is, therefore, to provide a torque control device in which the torque is set by the spring force of a coil spring. The motor is stopped when a load above the set torque acts on a tool. The present invention includes a clutch for transmitting the revolutional force which is released to prevent an over screw-in operation by an inertia force, and to decrease the shock or reaction at the completion of the screw-in operation, whereby a reliable operation can be performed.

Further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the detailed description of the preferred embodiments of the invention presented below, reference is made to the accompanying drawings, in which:

FIGS. 13, 14 and 15 are of the second embodiment of the present invention which correspond to FIGS. 3, 4 and 5, respectively, FIG. 16 is a section taken along the line 16—16 of FIG. 13, FIG. 17 is a section taken along the line 17—17 of FIG. 14, FIG. 18 is a section showing a movable cam, FIG. 19 is a side view of FIG. 18, FIG. 20 is an elevational view of a stationary cam, FIG. 21 is a left side view of FIG. 20, FIG. 22 is a right side view of FIG. 20, FIG. 23 is a partially broken elevational view of a rotational cylinder, FIG. 24 is a section taken along the line 24—24 of FIG. 23.

DETAILED DESCRIPTION OF THE INVENTION

Figure 1:
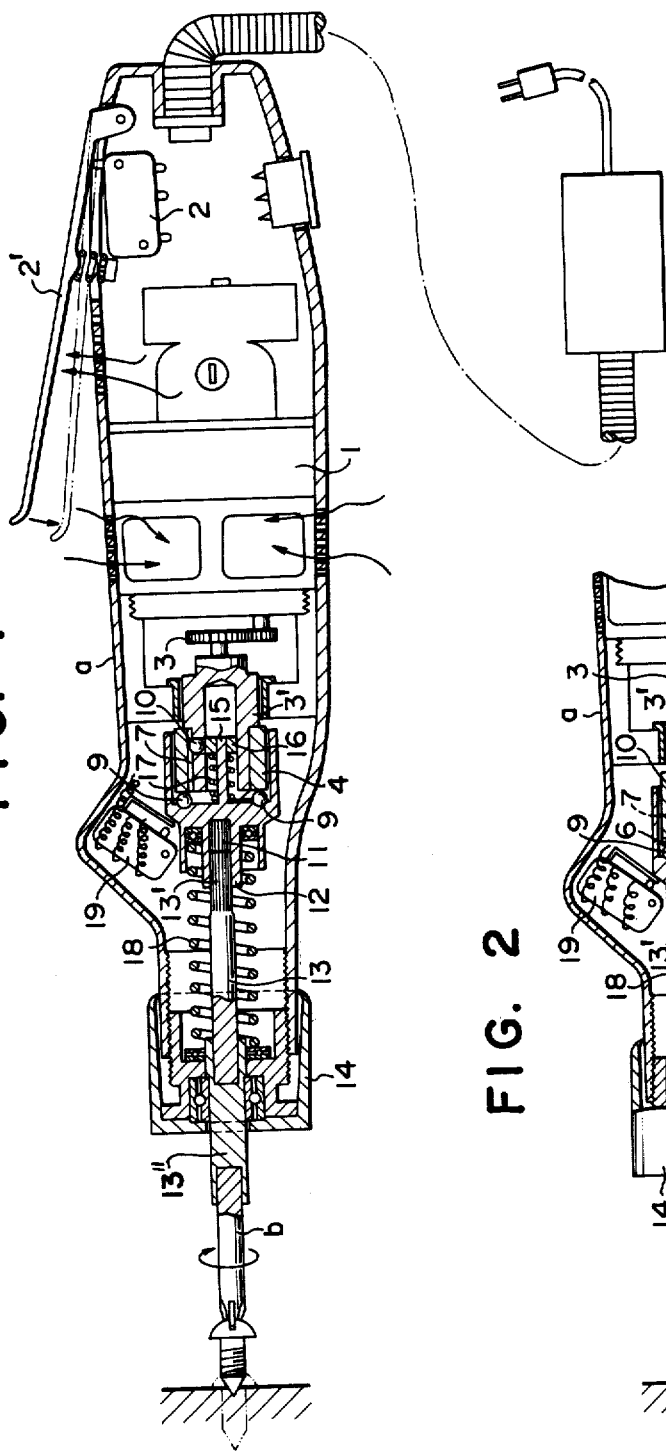
FIG. 1 is a partially broken longitudinal section of a torque control device according to the present invention.

The housing a accommodates therein a motor 1, a switch 2 for opening and closing a circuit including the motor 1 and a power source, and a reduction gear 3 for reducing the number of rotations of the motor 1 connected thereto. The output shaft 3' of the reduction gear 3 is provided with an engageable stationary cam 4. The stationary cam 4 is in the form of a cylinder and is provided, at its side face opposite to a movable cam 8, with tapered portions 5. Between the tapered portions 5 are formed recesses 6 which receive balls 9 connecting the stationary cam 4 to the movable cam 8 mentioned below. The stationary cam 4 is provided, at its inner periphery engaging with the output shaft 3' with a recess 7 which is engaged by a ball 10 provided in the output shaft 3'. The stationary cam 4 rotates together with the output shaft 3' when the ball 10 is positioned in the output shaft 3' and in the stationary cam 4, while no rotational movement of the output shaft 3' is transmitted to the stationary cam 4 when the ball 10 is out of engagement with the recess 7 of the cam 4.

The movable cam 8 is in the shape of a cylinder with a bottom closure, in which the stationary cam 4 is inserted. The movable cam 8 is provided, at its front side, with a boss 12 having a hole 11 in which is fitted a shaft 13 supporting a tool b (for example, a cross driver). The shaft 13 is in spline engagement with the hole 11, shown at 13'.

Balls 9 are attached to the bottom face of the movable cam 8 opposite to the boss 12, for example, to the face of the cam 8 opposite the stationary cam 4, which correspond to the tapered portions 5 of the cam 4. The rotational movement of the cam 4 is transmitted to the movable cam 8 when the balls 9 engage in the recesses 6 of the stationary cam 4.

The shaft 13 inserted in the hole 11 of the cam 8 extends through a screw adjustable cover 14 which is screwed on the front end of the housing a. The tool b is detachably mounted to and supported by the projecting end 13" of the shaft 13.

The movable cam 8 is provided, at the center of the bottom face thereof, with a projection 15, to which a sleeve 16 is slidably mounted. The projection 15 has an enlarged head 15' adapted to prevent the sleeve 16 from being separated therefrom. Between the bottom face of the movable cam 8 and the end face of the sleeve 16 is arranged a coil spring 17 which presses the sleeve 16 toward the free end of the projection 15 to maintain the ball 10 provided in the output shaft 3' in its upper position in which the ball 10 is engaged in the recess 7 of the cam 4.

Between the movable cam 8 constructed above and the screw adjustable cover 14, is arranged a coil spring 18 which presses the movable cam 8 to the stationary cam 4. The compression force of the spring 18 is adjusted by the screw adjustable cover 14.

The forward movement of the movable cam 8 causes the motor 1 to stop with the help of an electric circuit explained below.

Figure 2:
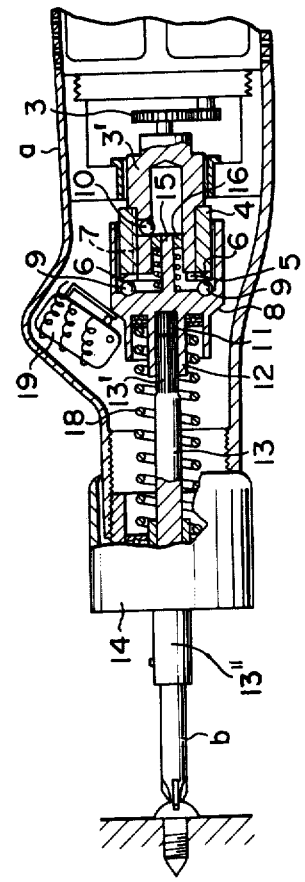
FIG. 2 is a longitudinal section of a part of the torque control device at the completion of the screw-in operation.

A signal switch 19 is positioned near the movable cam 8, and becomes ON when the movable cam 8 moves forwardly, resulting in production of an output pulse to stop the motor 1. The electric connections between the signal switch 19 and the motor 1 is shown in FIG. 2S, in which 20 designates a DC relay, 21 an AC relay, 22 a resistor, 23 a rectifier, 24 a transformer, 25 a diode, 26 a phase control circuit, 27 a switching circuit, 28 a power source (DC power source) regulator, 29 and 31 normally opened contacts of DC relay 20, 30 a normally closed contact of DC relay 20, 32 a switching contact of AC relay 21, 33 a normally closed contact of AC relay 21, and 34 a normally opened contact of AC relay 21, respectively.

The DC relay 20 is energized when the signal switch 19 is actuated, to hold the signal for setting the torque, and the gate of the phase control circuit 26 is opened through the normally closed contact 30 of the DC relay 20 to cut off the supplied voltage to the motor 1. In addition, when the AC relay 21 is energized and comes into a self-latched condition, the motor circuit (DC circuit) is simultaneously opened to short the circuit through the switching contact 32 of the AC relay 21 resulting in the rapid stopping of the motor 1 by the effect of the control of the generation of electric power.

When the AC relay 21 is energized, DC relay 20 which keeps it latched on is reset by the normally closed contact 33 of AC relay 21 and is in preparation for subsequent detecting steps. AC relay 21 continues to keep it latched on when the switch 2 attached to the housing a is actuated, to maintain the motor 1 in its inoperative condition.

When the switch 2 is not actuated, AC relay 21 is deenergized and its self-latched condition is released, resulting in completion of one cycled-operation. When the switch 2 is actuated, the same cycle is repeated.

The operation for controlling a torque will be discussed in detail below.

Figure 3:
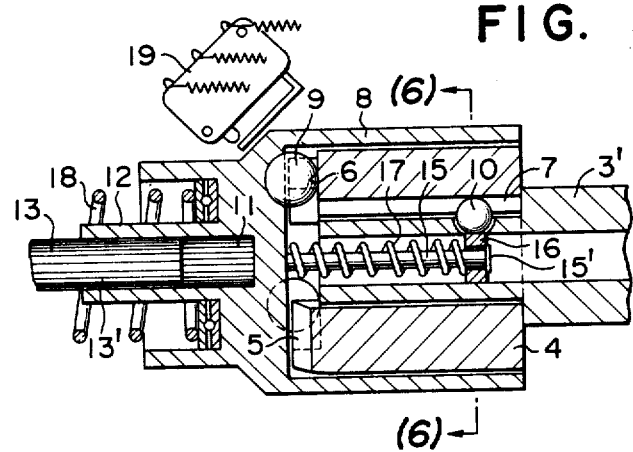
FIG. 3 is an enlarged section of a main part of the torque control device in which the power is transmitted.

The switch lever 2' is operated to move switch 2 to the ON position, resulting in the starting of the motor 1. The rotation of the motor 1 is transmitted to the shaft 13 through the movable cam 8 which is pressed against the stationary cam 4 engaging the output shaft 3' of the reduction gear 3 by the coil spring 18, and is consequently transmitted to the tool b supported by the shaft 13 (FIG. 3).

When an external force larger than a predetermined spring force of the coil spring 18 (but smaller than a maximum torque of the motor) acts on the tool b, the rotation of the shaft 13 supporting the tool b is stopped. The cam 4 engaging and being integral with the output shaft 3' of the motor, however, continues to rotate since the motor power is stronger than the external force.

As a result, the movable cam 8 which is displaceable in the thrust direction due to the spline engagement with the shaft 13 is moved forwardly by the height of the projections 5 of the stationary cam 4 and by the rotational movement of the stationary cam 4, while the cam 8 is not rotated.

Figure 4:
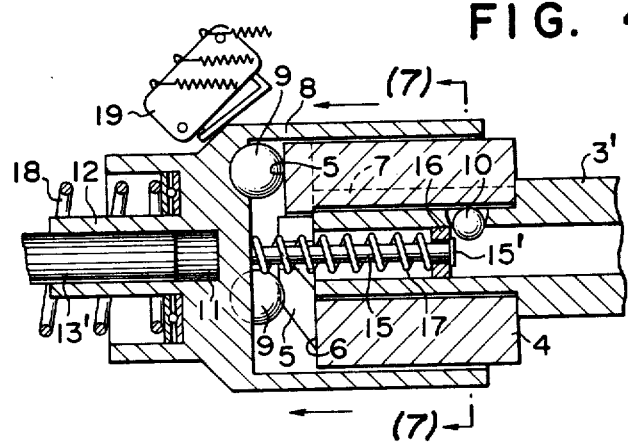
FIG. 4 is an enlarged section of the main part of the torque control device in which the torque reaches a predetermined value.

Due to the forward displacement of the movable cam 8, the signal switch 19 provided near the movable cam 8 is moved to the ON position and provides a signal to stop the motor 1. Then, the ball 10 which is now positioned in the output shaft 3' and in the stationary cam 4 moves into the output shaft 3' and disengages from the recess 7 of the stationary cam 4, since the projection 15 integral with the movable cam 8 also moves forward and disengages from the ball 10 at the same time as the forward displacement of the movable cam 8. Thus, the transmission connection beween the output shaft 3' and the stationary cam 4 is broken (FIG. 4).

When the transmission connection is broken, the stationary cam 4 is free from the output shaft 3'.

Then, the movable cam 8 is moved rearward (in the direction towards the right as shown in the drawings) by the coil spring 18 and consequently the balls 9 provided on the movable cam 8 move to the recesses 6 of the stationary cam 4. The stationary cam 4 is rotated by the spring force of the coil spring 18 since it is free from the output shaft 3'. As a result, the ball 10 provided on the output shaft 3' projects toward the inner side of the output shaft 3' to press the sleeve 16 forward against the coil spring 17, since the ball 10 has disengaged from the recess 7 of the stationary cam 4.

Figure 5:
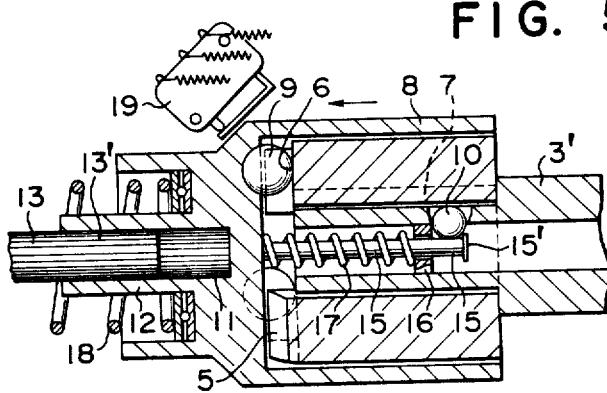
FIG. 5 is an enlarged section of the main part of the torque control device in a position in which the connection between the stationary cam and the output shaft is broken.
Figure 6:
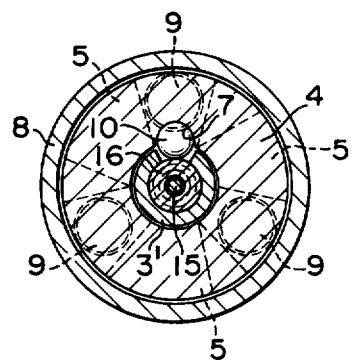
FIG. 6 is a sectional view taken along the line 6—6 of FIG. 3.
Figure 7:
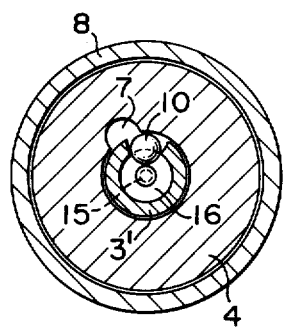
FIG. 7 is a sectional view taken along the line 7—7 of FIG. 4.
Figure 8:
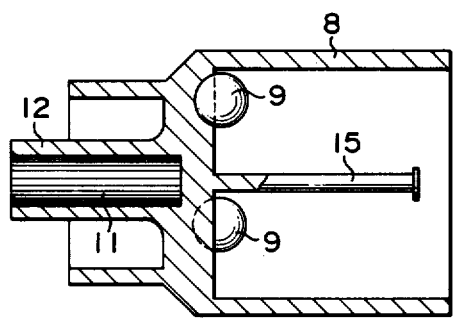
FIG. 8 is a section showing the movable cam.
Figure 9:
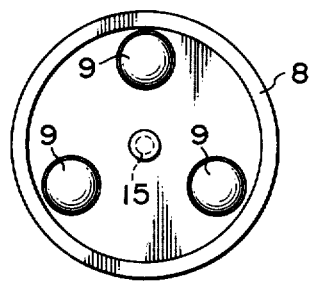
FIG. 9 is a side view of FIG. 8.
Figure 10:
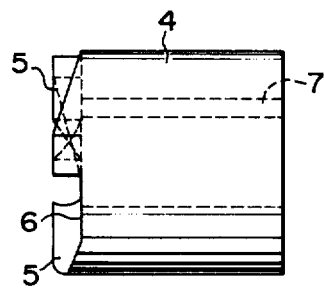
FIG. 10 is an elevational view of the stationary cam.
Figure 11:
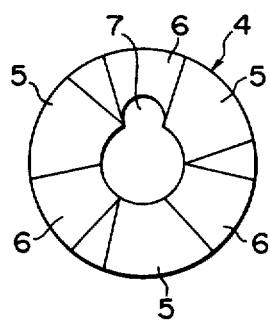
FIG. 11 is a left side view of FIG. 10.
Figure 12:
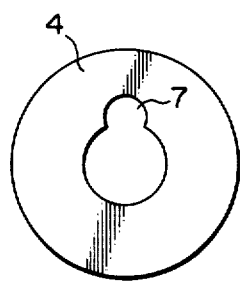
FIG. 12 is a right side view of FIG. 10.

The motor 1 is stopped and the disengagement of the stationary cam 4 with the movable cam 8 is maintained until the switch 2 is moved to the ON position (FIG. 5).

It will be noted that the sleeve 16 tends to move rearward by the spring force of the coil spring 17 and the ball 10 tends to move upwardly by the pressure force of the sleeve 16.

The motor 1 is rotated to rotate the output shaft 3' when the switch 2 is actuated again. One turn of the output shaft 3' causes the ball 10 on the shaft 3' to come into alignment with the recess 7 of the stationary cam 4. Consequently the ball 10 moves upward due to the displacement of the sleeve 16 pressed rearward by the coil spring 17, to engage the recess 7. Thus the stationary cam 4 rotates together with the output shaft 3' and the rotation is transmitted to the movable cam 8.

The above-mentioned clutch mechanism comprising the stationary cam 4 and the movable cam 8 may be also constructed as shown in FIGS. 13 to 23 which show another embodiment of the invention. In these drawings, components corresponding to those shown in FIGS. 1 to 12 are designated by the same numerals.

The engagement between the output shaft 3' and the stationary cam 4 is established when the ball 10 provided on the output shaft 3' is fitted in the window hole 34 formed in the stationary cam 4. To the outer side of the stationary cam 4 is rotatably attached a rotating cylinder 35 which is provided, at its inner periphery, with an internal gear 36 engaging a gear 37 secured to the stationary cam 4. The gear 37 engages a gear 38 provided on the outer periphery of the output shaft 3'.

Figure 13:
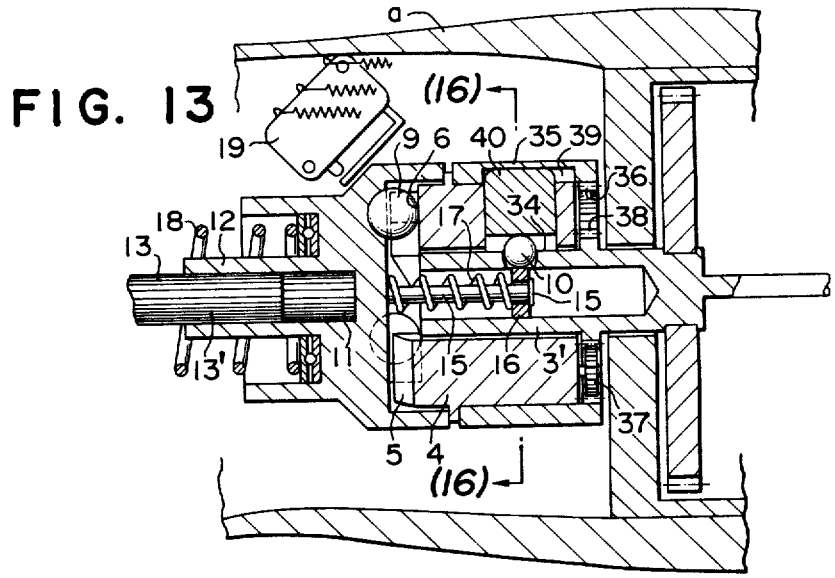
FIG. 13 to FIG. 24 show another embodiment of the present invention.

On the inner side of the rotating cylinder 35 is formed a recess 39 in which a pin 40 is arranged to be slidable in an upwardly and downwardly direction. The pin 40 also occupies the window hole 34 of the stationary cam 4. Thus the output shaft 3 and the stationary cam 4 engaging the shaft 3' through the ball 10 therebetween can be considered a single body or unit as a transmission unit of the power, and the stationary cam 4 and the rotating cylinder 35 engaging the cam 4 through the pin 40 can also be considered a single body or unit. Thus, as illustrated in FIG. 13, when the output shaft 3' is rotated, the stationary cam 4 and the rotating cylinder 35 are also rotated together, and the rotation of the stationary cam 4 is transmitted to the movable cam 8 in the same way as that shown in the first embodiment.

Figure 14:
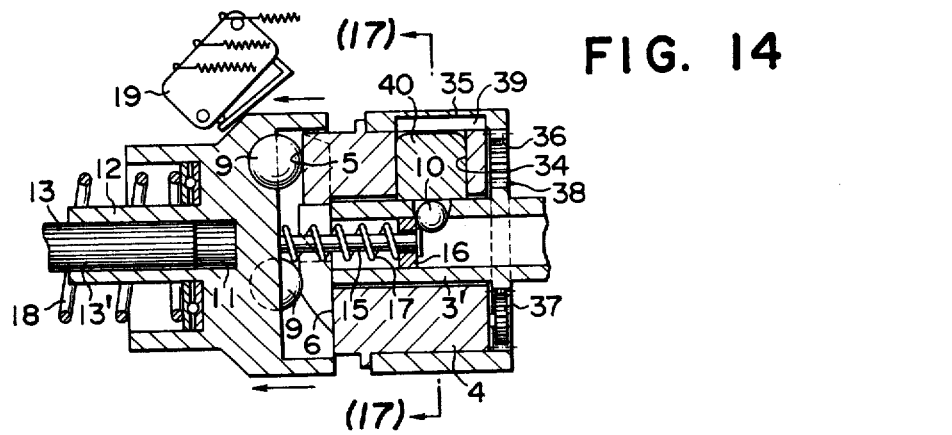

When an external force larger than a predetermined spring force of the coil spring 18 (but smaller than the maximum torque of the motor) acts on the tool b, the shaft carrying the tool b is stopped but the stationary cam 4 engaging the output shaft 3' continues to rotate. Thus, the movable cam 8 is displaced forward in the same way as the first embodiment to actuate the signal switch 19 which stops the motor 1. Finally, as illustrated in FIG. 14, the engagement between the output shaft 3' and the stationary cam 4 is broken.

Figure 15:
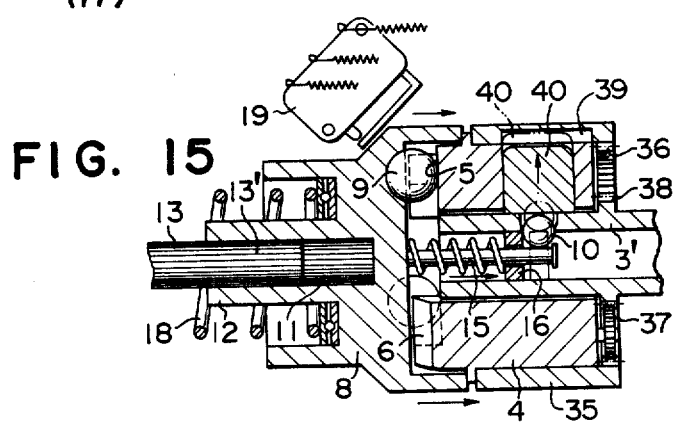
Figure 16:
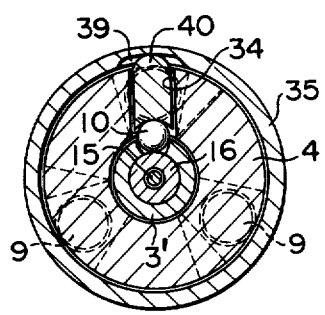
Figure 17:
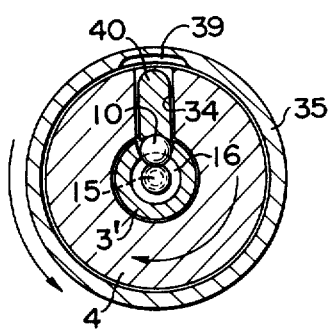
Figure 18:
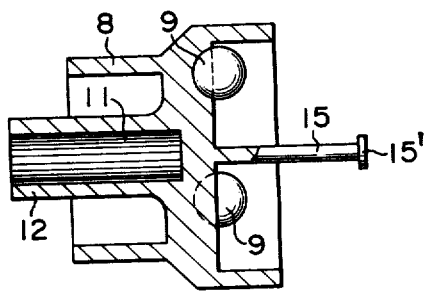
Figure 19:
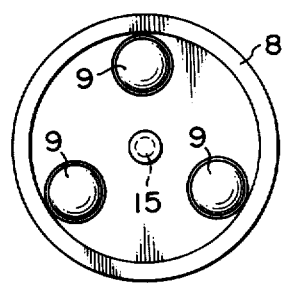
Figure 20:
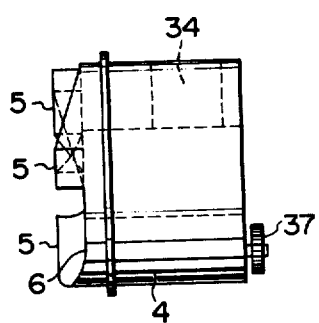
Figure 21:
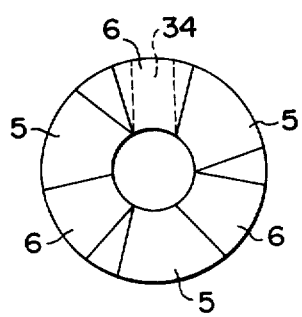
Figure 22:
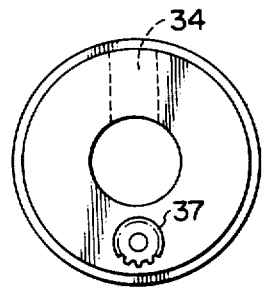
Figure 23:
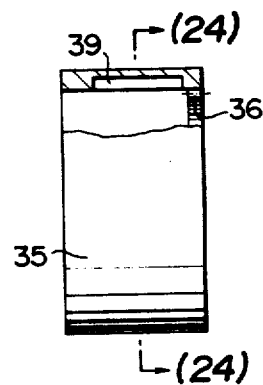
Figure 24:
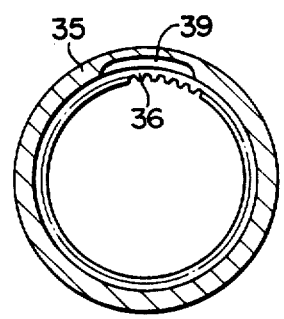
Figure 25:
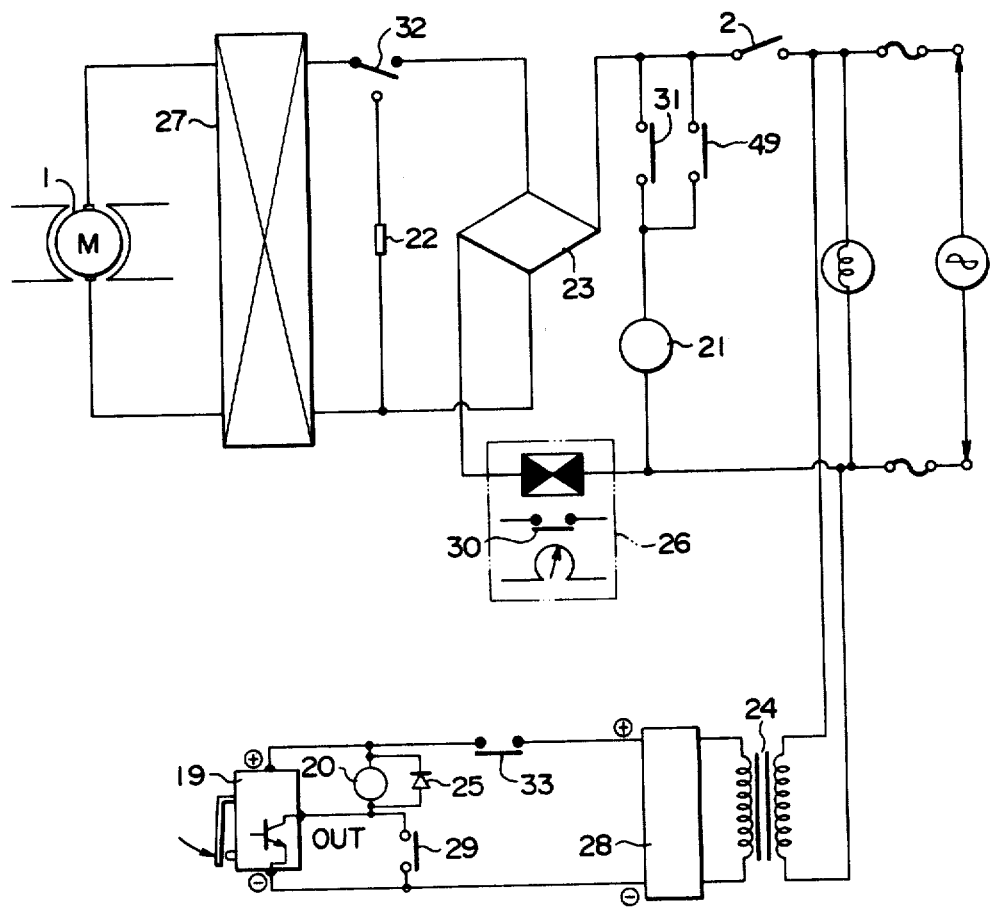
FIG. 25 is a view showing an electric circuit.

The movable cam 8 is moved rearwardly by the coil spring 18 and occupies a position shown in FIG. 15. The position shown in FIG. 15 is maintained until the switch 2 is again actuated.

When the switch 2 is moved to the ON position to rotate the output shaft 3', the rotating cylinder 35 rotates in the reverse direction due to the engagement of the gear 38 with the gear 37 and the engagement of the gear 37 with the internal gear 36 of the cylinder 35. When the window hole 34 of the stationary cam 4 comes into alignment with the recess 39 of the rotating cylinder 35, the sleeve 16 is moved rearward (the right hand direction as shown in the drawings, by the coil spring 17, and the ball 10 and the engaging pin 40 are moved upward, respectively. Consequently, the output shaft 3', the stationary cam 4 and the rotating cylinder 35 can be considered a single body and the rotation of the output shaft 3' is transmitted to the movable cam 8.

As can be seen from the above, the number of revolutions of the rotating cylinder 35 to the number of revolutions of the output shaft 3' can be changed by varying the gear ratio between the gear 38 of the output shaft 3' and the gear 36 of the rotating cylinder 35.

Once the clutch consisting of the stationary cam 4 and the movable cam 8 is released, the re-connection of the clutch is established only after a further two or three turns of the output shaft 3'. As a result, even if the rotation of the output shaft 3' is not rapidly stopped, there is no possibility that a machine screw or a bolt which has been completely screwed-in is further screwed-in or fastened.

Figure 26:
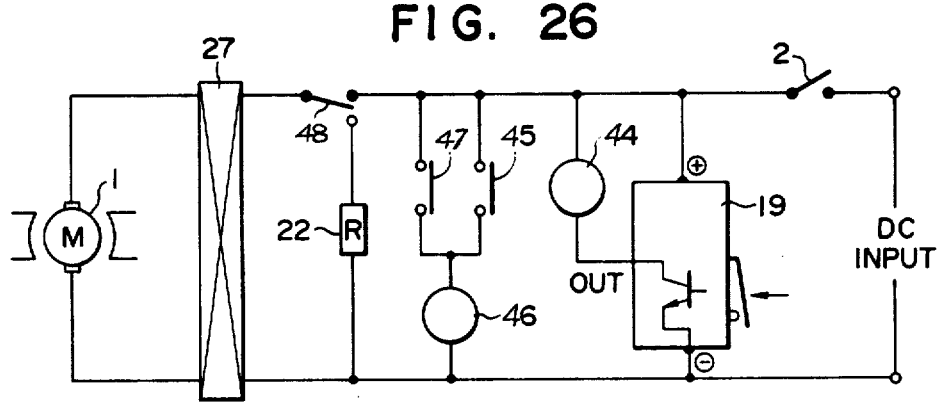
FIG. 26 is a view showing an electric control circuit for a cordless electric tool.

In the embodiments mentioned above, the torque control device is driven by an AC power source but the present invention can also be adapted to a torque control device for a cordless electric tool driven by a DC power source. An electric control circuit for the torque control device is shown in FIG. 26. When the signal switch 19 is mechanically actuated in the same way as that shown in the above-mentioned embodiments, DC relay 44 is energized and DC relay 46 is also energized by the contact 45. When the DC relay 46 is energized, it comes in latching condition with the help of the contact 47 and opens the motor circuit to short the circuit through the contact 48, resulting in the rapid stopping of the motor. During the actuation of the switch 2 attached to the housing a, the motor 1 continues to stop since DC relay 46 maintains its latching condition.

When the switch 2 is moved to the OFF position, DC relay 46 is deenergized and one-cycled operation is completed. When the switch 2 is actuated or is moved to the ON position again, the same cycle is repeated. In FIG. 26, numeral 45 shows a normally opened contact of DC relay 44 and 47 a normally opened contact of DC relay 46 and 48 and a switching contact of DC relay 46.

Figure 27:
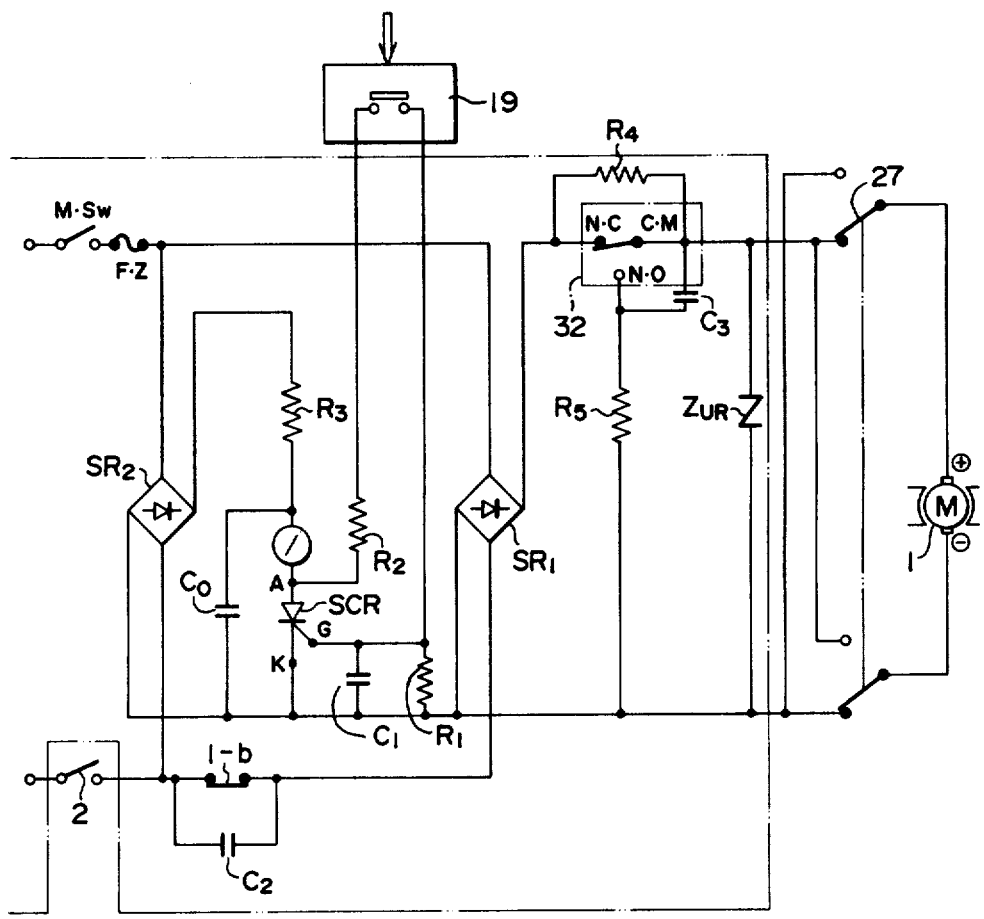
FIG. 27 is a view showing an electric control circuit for a torque control device driven by an AC power source.

FIG. 27 shows an electric control circuit for a torque control device driven by an AC power source according to another embodiment of the invention.

First, the main switch (M.SW) is moved to the ON position and then the operating lever 2' provided on the screw-driver body is actuated to move the actuating switch 2 to the ON position. As a result, the electric power is fed to the motor 1 through a rectifier ($SR_1$), a switching contact 32 of a detecting relay 50, and a normally closed contact (1-b) of the detecting relay 50 and consequently the motor is rotated to start the screw-in operation. At the same time the condenser (Co) is charged by the output of a control rectifier ($SR_2$) through a resistor $R_3$, a semiconductor controlled rectifier (SCR) is in a waiting position until a torque detecting signal is given to the gate of the SCR. The screw-in operation continues until the torque reaches a predetermined value. When a predetermined torque is detected, the signal switch 19 becomes On through the mechanical actuation mentioned above to give a signal to the gate of SCR.

SCR is energized by the gate signal and the detecting relay 50 can be easily energized by compensating for the electric current enough to energize the detecting relay by the condensor (Co).

SCR keeps it latched on even when gate signal is fed thereto. Further the condensor (Co) ensures that SCR keeps it latched on, which cannot otherwise keep it latched on at a "0" voltage point since the output of $SR_2$ is a full-wave rectified one.

When SCR is energized, the detecting relay 50 is also energized to cut off the AC input power source through the normally closed contact (1-b) thereof. Consequently, the output of $SR_1$ becomes "0," and no voltage is fed to the motor 1. Further, a circuit for shorting the terminals of the contact through the control resistor ($R_5$) is established by the switching contact 32 of the detecting relay 50. As a result the motor 1 is rapidly controlled and stopped so that the inertia force of the motor is absorbed.

The clutch mechanism is actuated when the signal switch 19 becomes ON, to disconnect the output shaft of the motor from the shaft for transmitting the output power.

Figure 28:
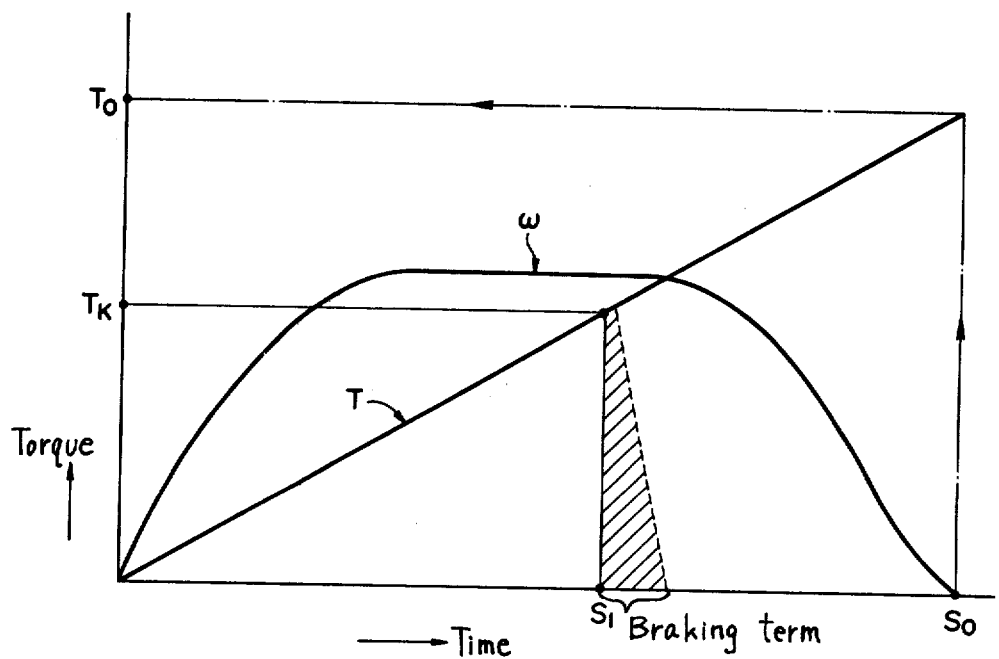
FIG. 28 is a diagram showing a relationship between a predetermined torque and the inertia force of the motor.

Generally speaking, when no power transmission connection is broken even if a fastening torque is adjust-set, the inertia force which the motor has increases the torque in proportion to a time (So) during which the inertia force is reduced to zero. That is, the fastening operation is effected with a torque (To) larger than the set torque (Tk). However, according to the present invention, the torque can be set independently of the inertia force of the motor since the power transmission connection is rapidly broken. Further, the inertia force of the motor is controlled and absorbed immediately after the power transmission connection is broken, as mentioned above (FIG. 28).

The motor 1 which has been rapidly stopped maintained in this condition and is returned to its initial position when the operation is completed and when the actuation lever 2' is returned to its original position to cut off the output of $SR_2$, resulting in a release of SCR and the detecting relay 50 which have been kept latched on. The same cycle is repeated by actuating the lever 2' again.

In FIG. 27, $C_2$ shows a condensor for protecting the normally closed contact (1-b), $R_4$ a resistor for protecting the switching contact 32, and 27 a switch for rotating and reversing the motor 1. The signal switch 19 may be replaced with a reed switch, a contactless switch or the like.

As can be seen from the above discussion, according to the present invention, the motor is stopped and the clutch is released as soon as the torque reaches a predetermined value. Thus, it is possible to eliminate the disadvantage of an over-fastening due to the inertia force.

In addition, the coil spring serves as a damper since it is compressed until the torque reaches a predetermined one, and accordingly a machine screw, a bolt, a nut or the like can be smoothly completely fastened or screwed-in with a predetermined torque.

Further, since the power is completely cut as soon as the fastening operation is completed, no reaction acts on an operator who supports the electric tool, resulting in a decrease in the fatigue of the operator. In case of failure or insufficiency of the screw-in operation due to the lack of the length of the screw thread provided on the screw, the screw can be easily and quickly removed with the help of all of the torque of the motor which acts on the tool, since the clutch mechanism consisting of the stationary cam and the movable cam acts only at the time of direct rotation of the motor.

Since the set torque is adjusted by the compression of the coil spring, not only the set torque is surely kept constant but also the change of the set torque can also be easily effected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A torque control device for an electrically driven tool comprising:
    a stationary cam detachably connected to a front end of an output shaft of a reduction means which is connected to an output shaft of a motor provided in a housing, a front end periphery of said stationary cam being provided with spaced and tapered portions;
    a movable cam arranged opposite to said stationary cam to engage the latter;
    drive engagement means being provided on the inner bottom of the movable cam and in recesses formed between the tapered portions of the stationary cam;
    a main shaft being slidably attached in an axial direction to the front portion of the movable cam and being rotatable together with the movable cam, the front end of the main shaft extending through an adjustable screw cover threaded in the front end of the housing;
    a projecting end of said main shaft being provided with a tool detachably connected thereto;
    a coil spring being compressibly arranged between the front face of the movable cam and the adjustable screw cover to press the movable cam against the stationary cam;
    a signal switch positioned adjacent to the front portion of the movable cam for issuing a signal for terminating a supply of electric power to the motor;
    said signal switch being operated when it is engaged by forward displacement of the movable cam which is displaced forward when an external force acting on the tool is greater than a predetermined pressure force of the coil spring adjusted by the rotation of the adjustable screw cover; and
    engaging means being provided between the movable cam and the output shaft to break a connection between the stationary cam and the output shaft by the forward displacement of the movable cam.

2. A torque control device according to claim 1, further comprising an epicyclic gear mechanism provided between the output shaft and the stationary cam to prevent the output shaft from being retransmitted to the stationary cam during the rotational movement of the output shaft due to inertia force produced after the supply of electric power to the motor is terminated.

3. A torque control device according to claim 1, wherein said drive engagement means comprises at least one ball for providing a drive connection between said movable cam and said stationary cam.

4. An electrically driven tool comprising:
    a drive means including a motor and a reduction means being positioned within a housing;
    a power transmission means including a stationary cam which is detachably connected to an output shaft of said reduction means by means of a displaceable ball, said power transmission means being provided with spaced and tapered portions, and a movable cam including a shaft connected to the front end thereof, said movable cam being displaceable forward along an axis of the shaft;
    said shaft being rotated by the rotation of said stationary cam via a ball arranged in a recess between said tapered portions, said rotation being terminated when an external force acting of said shaft is greater than a predetermined force;
    a signal switch provided in front of and separated from said movable cam, said signal switch being operated to terminate the supply of electric power to the motor when the front end of the movable cam is brought into engagement with the signal switch by the forward displacement of the movable cam;

a torque controlling means for controlling the fastening torque applied to a tool mounted on the front end of said shaft, said torque controlling means including a spring which is arranged between the front end of the movable cam and a rotatable screw cover provided on the front end of the housing; and an engaging means for connecting said output shaft and the stationary cam being responsive to an inertia with respect to the stationary cam which is stopped from rotation and by means of a sliding movement of a spring-biased slidable sleeve attached to the movable cam, said displaceable ball arranged between said output shaft and said stationary cam for providing a mechanical connection therebetween being displaced and retracted by the forward movement of the movable cam.

5. An electrically driven tool according to claim 4, and further comprising an epicyclic gear mechanism being provided between the output shaft and the stationary cam to prevent the output shaft from being retransmitted to the stationary cam during the rotational movement of the output shaft due to inertia force produced after the supply of electric power to the motor is terminated.

* * * * *